(12) United States Patent
Goldberg et al.

(10) Patent No.: US 10,289,603 B2
(45) Date of Patent: *May 14, 2019

(54) DYNAMIC SEARCH PARTITIONING

(71) Applicant: A9.com, Inc., Palo Alto, CA (US)

(72) Inventors: Jonathan Michael Goldberg, San Francisco, CA (US); Asif Mansoor Ali Makhani, San Jose, CA (US); Ekechi Karl Edozle Nwokah, Palo Alto, CA (US)

(73) Assignee: Amazon TEchnologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/362,503

(22) Filed: Nov. 28, 2016

(65) Prior Publication Data

US 2017/0075577 A1     Mar. 16, 2017

Related U.S. Application Data

(63) Continuation of application No. 13/650,931, filed on Oct. 12, 2012, now Pat. No. 9,507,750.

(51) Int. Cl.
    *G06F 15/167* (2006.01)
    *G06F 16/182* (2019.01)
    *G06F 3/06* (2006.01)

(52) U.S. Cl.
    CPC ........ G06F 15/167 (2013.01); G06F 16/1827 (2019.01); *G06F 3/0631* (2013.01)

(58) Field of Classification Search
    CPC .... G06F 3/0631; G06F 15/167; G06F 17/302; G06F 16/1827
    See application file for complete search history.

(56) References Cited

U.S. PATENT DOCUMENTS

| | | | | |
|---|---|---|---|---|
| 5,991,860 A | * | 11/1999 | Gross | ........................ G06F 8/67 |
| | | | | 711/115 |
| 6,185,666 B1 | * | 2/2001 | Murray | ................. G06F 3/0607 |
| | | | | 711/173 |

(Continued)

FOREIGN PATENT DOCUMENTS

| | | |
|---|---|---|
| AU | 2013328901 | 10/2013 |
| AU | 2016231488 | 1/2018 |

(Continued)

OTHER PUBLICATIONS

U.S. Non-Final Office Action issued in U.S. Appl. No. 13/650,931 dated Sep. 18, 2014.

(Continued)

*Primary Examiner* — Gil H. Lee
(74) *Attorney, Agent, or Firm* — Hogan Lovells US LLP

(57) ABSTRACT

A system can monitor data usage, including an amount of searchable data used and/or a rate at which the searchable data is manipulated, on a storage allocation in a networked environment. The storage allocation can have a quantity/number of partitions, including at least one partition, configured to store the searchable data. The system can detect that the data usage is beyond a specified threshold and then based at least in part on factors such as network traffic, CPU usage, and/or data usage, the system can modify the storage allocation to increase or decrease a size of the partition and/or the quantity of partitions. Network traffic for the storage allocation can be directed away from the portion of the storage allocation being modified. When modifying the storage allocation is complete, the network traffic can be directed to the modified portion of the storage allocation.

18 Claims, 6 Drawing Sheets

(56) References Cited

U.S. PATENT DOCUMENTS

| | | | |
|---|---|---|---|
| 7,092,870 B1 | | 8/2006 | Chen et al. |
| 7,685,109 B1 | * | 3/2010 | Ransil .............. G06F 17/30336 707/999.003 |
| 7,716,168 B2 | | 5/2010 | Selca et al. |
| 7,788,233 B1 | | 8/2010 | Willeford et al. |
| 8,190,593 B1 | * | 5/2012 | Dean ................. G06F 17/30864 707/707 |
| 8,266,173 B1 | | 9/2012 | Reztlaff et al. |
| 8,539,197 B1 | | 9/2013 | Marshall et al. |
| 9,047,326 B2 | | 6/2015 | Goldberg |
| 9,411,839 B2 | | 8/2016 | Goldberg |
| 9,507,750 B2 | | 11/2016 | Goldberg |
| 2002/0103876 A1 | | 8/2002 | Chatani et al. |
| 2005/0044228 A1 | * | 2/2005 | Birkestrand .......... G06F 9/5072 709/226 |
| 2007/0002612 A1 | | 1/2007 | Chang et al. |
| 2007/0033340 A1 | | 2/2007 | Tulskie et al. |
| 2007/0043923 A1 | * | 2/2007 | Shue ..................... G06F 3/0605 711/170 |
| 2008/0086451 A1 | | 4/2008 | Torres et al. |
| 2008/0243778 A1 | | 10/2008 | Behnen et al. |
| 2009/0100478 A1 | * | 4/2009 | Craner .................. G11B 19/00 725/87 |
| 2009/0198670 A1 | | 8/2009 | Shiffer et al. |
| 2010/0011368 A1 | | 1/2010 | Arakawa et al. |
| 2010/0082715 A1 | * | 4/2010 | Dohm ................... G06F 3/0608 707/822 |
| 2010/0088318 A1 | * | 4/2010 | Kan .................. G06F 17/30613 707/741 |
| 2010/0161569 A1 | * | 6/2010 | Schreter ............ G06F 17/30327 707/696 |
| 2010/0169361 A1 | | 7/2010 | Chen et al. |
| 2010/0228721 A1 | | 9/2010 | Mok et al. |
| 2011/0131202 A1 | | 6/2011 | Cohen et al. |
| 2011/0225165 A1 | | 9/2011 | Burstein |
| 2012/0011311 A1 | | 1/2012 | Orikasa et al. |
| 2012/0072694 A1 | | 3/2012 | Yochai et al. |
| 2012/0143873 A1 | | 6/2012 | Saadat |
| 2012/0166751 A1 | | 6/2012 | Matsumoto et al. |
| 2012/0191577 A1 | | 7/2012 | Gonsalves et al. |
| 2013/0097134 A1 | | 4/2013 | Thompson et al. |
| 2014/0025626 A1 | | 1/2014 | Mefford et al. |
| 2014/0108434 A1 | | 4/2014 | Goldberg |
| 2014/0108587 A1 | | 4/2014 | Goldberg |
| 2014/0181071 A1 | * | 6/2014 | Pidduck ............ G06F 17/30117 707/711 |
| 2015/0261802 A1 | | 9/2015 | Goldberg |

FOREIGN PATENT DOCUMENTS

| | | |
|---|---|---|
| AU | 2017245374 | 11/2018 |
| BR | 11 2015 008146 0 | 7/2017 |
| CA | 2888116 | 3/2018 |
| CN | 2018114244974 | 11/2018 |
| CN | 104823169 | 12/2018 |
| EP | 2907034 | 5/2016 |
| IN | IN3160DEN2015 | 10/2015 |
| JP | 2007-280099 | 10/2007 |
| JP | 4772569 | 7/2011 |
| JP | 2011/118427 | 9/2011 |
| JP | 2012-507086 | 3/2012 |
| JP | 5607059 | 9/2014 |
| JP | 2015-532493 | 11/2015 |
| JP | 2016-211567 | 12/2016 |
| KR | 10-2002-0066971 | 8/2002 |
| KR | 10-1737246 | 5/2017 |
| KR | 10-1782302 | 9/2017 |
| SG | 11201502828 P | 8/2016 |
| SG | 10201606363 S | 7/2017 |
| WO | 2012/020741 | 2/2012 |
| WO | 2012/072879 | 6/2012 |
| WO | 2014/059394 | 4/2014 |

OTHER PUBLICATIONS

U.S. Non-Final Office Action issued in U.S. Appl. No. 13/650,931 dated May 1, 2015.
U.S. Final Office Action issued in U.S. Appl. No. 13/650,931 dated Oct. 13, 2015.
U.S. Notice of Allowance issued in U.S. Appl. No. 13/650,931 dated Mar. 16, 2016.
U.S. Notice of Allowance issued in U.S. Appl. No. 13/650,931 dated Aug. 9, 2016.
U.S. Non-Final Office Action issued in U.S. Appl. No. 13/650,961 dated Aug. 8, 2014.
U.S. Notice of Allowance issued in U.S. Appl. No. 13/650,961 dated Feb. 9, 2015.
U.S. Non-Final Office Action issued in U.S. Appl. No. 14/728,109 dated Jul. 27, 2015.
U.S. Final Office Action issued in U.S. Appl. No. 14/728,109 dated Dec. 3, 2015.
U.S. Notice of Allowance issued in U.S. Appl. No. 14/728,109 dated Apr. 12, 2016.
AU Examination Report dated Feb. 12, 2016 issued in application serial No. 2013328901.
EP EESR dated Apr. 19, 2016 issued in application serial No. 13845541.5.
KR Office Action dated Mar. 22, 2016 issued in application serial No. 10-2015-7012030.
SG Written Opinion dated Aug. 14, 2015 issued in application serial No. 1120152828P.
International Search Report and Written Opinion dated Jan. 29, 2014 issued in application serial No. PCT/US2013/064731.
International Preliminary Report on Patentability dated Apr. 14, 2015 issued in application serial No. PCT/US2013/064731.
Canadian Intellectual Property Office, Examination Report issued in Application No. 2,888,116, dated May 24, 2017.
Intellectual Property Office of Singapore, Notice of Eligibility for Grant issued in Application No. 10201606363S, dated Jun. 6, 2017.
IP Australia, Examination Report No. 1, issued in Application No. 2016231488, dated Aug. 18, 2017.
Intellectual Property Office of Singapore, Supplementary Examination Report, issued in Application No. 10201606363S, dated May 19, 2017.
First Office Action issued in Japanese Application No. 2016-211567, dated Nov. 7, 2017.
Second Office Action issued in Chinese Application No. 201380053433.7, dated Sep. 30, 2017.
Third Office Action issued in CN Application No. 2013800534337 dated Mar. 7, 2018.
Notice of Acceptance dated Jul. 19, 2018 in related Australian Patent Application No. 2017245374.
Notice of Acceptance issued in co-related Australian Application No. 2013328901 dated Jul. 15, 2016.
Notice of Acceptance issued in co-related Australian Application No. 2016231488 dated Sep. 6, 2017.
Examination Report issued in co-related Australian Application No. 2017245374 dated Jul. 19, 2018.
Office Action issued in co-related Canadian Application No. 2888116 dated Jun. 22, 2016.
Notice of Allowance issued in co-related Canadian Application No. 2888116 dated Jan. 10, 2018.
Examination Report issued in co-related European Application No. 13845541.5 dated Dec. 18, 2018.
Office Action issued in co-related Japanese Application No. 2015-536973 dated Aug. 16, 2016.
Office Action issued in co-related Japanese Application No. 2016-211567 dated Feb. 7, 2018.
Notice of Allowance issued in co-related Japanese Application No. 2016-211567 dated Nov. 7, 2018.
Office Action issued in co-related Korean Application No. 10-2015-7012030 dated Sep. 27, 2017.
Notice of Allowance issued in co-related Korean Application No. 10-2015-7012030 dated Mar. 30, 2017.
Supplementary Examination Report issued in co-related Singapore Application No. 11201502828P dated Jun. 3, 2016.

(56) References Cited

OTHER PUBLICATIONS

Notice of Grant issued in co-related Singapore Application No. 11201502828P dated Jun. 27, 2016.

* cited by examiner

DYNAMIC SEARCH PARTITIONING

CROSS-REFERENCES TO RELATED APPLICATIONS

This application is a continuation of allowed U.S. application Ser. No. 13/650,931, entitled "DYNAMIC SEARCH PARTITIONING," filed Oct. 12, 2012; of which the full disclosure of this application is incorporated herein by reference for all purposes.

BACKGROUND

Computing devices are often used to communicate over a network such as the Internet. Computing resources (hardware and software) that are delivered as a service over a network (typically the Internet) is becoming more commonplace. Computing devices are frequently used to connect to this type of computing service (i.e., network based service), which can provide services such as storing searchable data to be used/retrieved by the computing devices or providing additional processing power to the computing devices. With respect to the remote (e.g., network based) storage of searchable data, users of computing devices typically purchase an initial amount of storage space and must request for more storage space when the initial space runs out. This can be inconvenient or cumbersome to a user who may need to frequently scale the size of his/her storage space.

BRIEF DESCRIPTION OF THE DRAWINGS

Various embodiments in accordance with the present disclosure will be described with reference to the drawings, in which.

DETAILED DESCRIPTION

Figure 1:
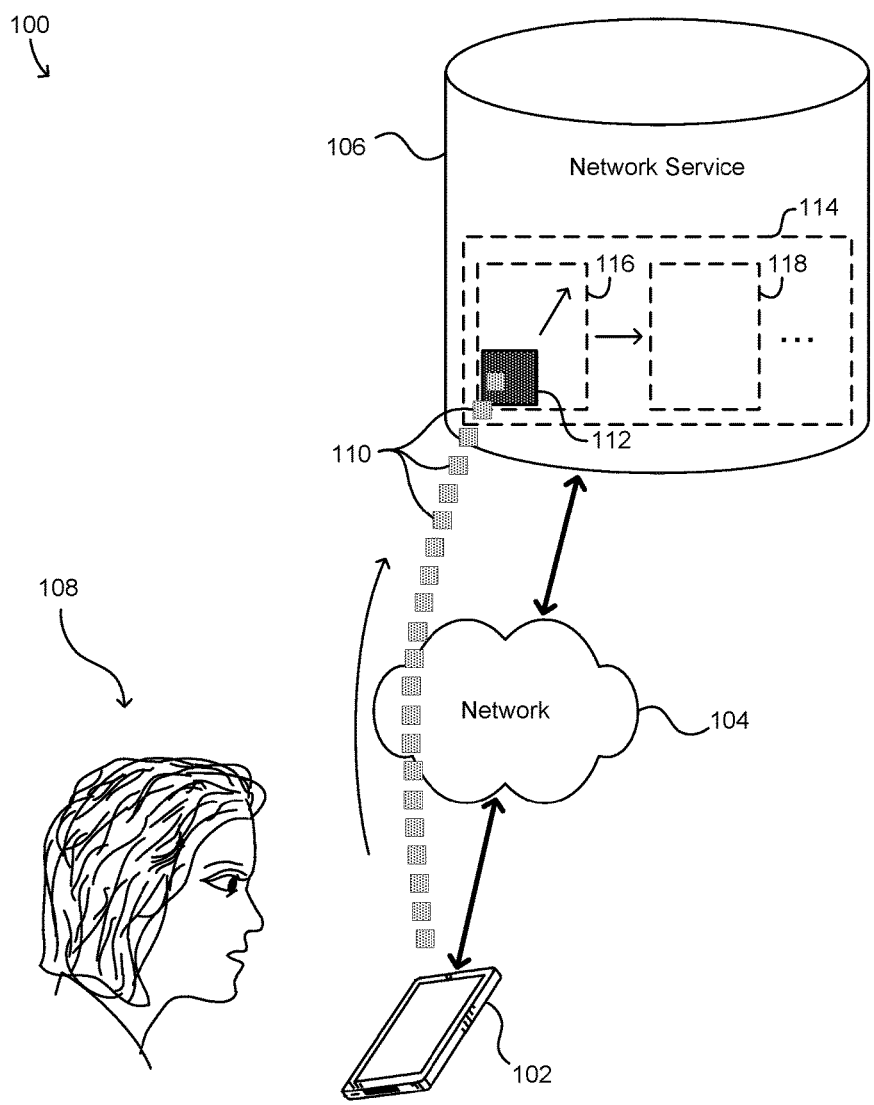
FIG. 1 illustrates an example environment in which aspects of the various embodiments can be utilized.

Systems and methods in accordance with various embodiments of the present disclosure overcome one or more of the above-referenced and other deficiencies in conventional approaches to managing data usage in a networked environment. In particular, various embodiments of the present disclosure can dynamically adjust a size of a storage allocation in a networked environment based at least in part on a current usage of data with respect to the storage allocation in the networked environment, and update a search index for the storage allocation.

At least some embodiments enable a computing device to upload data over a network (e.g., the Internet) onto a storage allocation provided by a network service (i.e., network service provider, network based service, etc.) and to search for the uploaded data over the network via the network service. There can be at least one partition (e.g., one or more hosts, one or more servers, etc.) included in the storage allocation configured to store the data uploaded, used, and/or searched by the computing device. In some embodiments, a host and/or server can include multiple partitions and a partition can span multiple hosts and/or servers. In some embodiments, one partition can correspond to one host. In some embodiments, one partition can correspond to a unit that sits at one computing instance. By monitoring the storage allocation, the partition can be automatically (i.e., without an instruction or request from the computing device) scaled/resized based on increases or decreases in data volume used by the computing device and/or based on increases to the rate of data manipulation (e.g., data upload, data removal, etc.) by the computing device. One or more partitions (e.g., hosts, servers, etc.) other than the at least one partition can also be automatically added or subtracted from the storage allocation based on monitoring the amount and/or rate of data manipulation (i.e., data usage). In some embodiments, the size of a first partition can be increased, until the first partition reaches a maximum partition size; subsequently, an additional partition can be added. Moreover, the network service can also automatically build, rebuild, and/or update a search index for the storage allocation subsequent to the scaling/resizing and/or adding/subtracting of partition(s).

In one example, an entity (e.g., customer of the network service) can create a network search domain via the network service. The network service can deploy a search partition on an elastic network based computing instance for the customer. The network service can monitor the total size of a search index for the elastic network based computing instance. Moreover, network based search in accordance with the present disclosure can support real-time (or near real-time) indexing. As the entity sends data (e.g., documents, file, information, etc.) to be uploaded, the size of its index can grow in real-time (or near real-time). There can also be a monitor unit configured to monitor the search index for the elastic network based computing instance/partition. Depending on what type of instance is deployed, there can be a specified threshold with which the monitor unit compares the size of the search index for the instance. If the size of the search index is over the threshold, then the monitor unit can send a signal to the network service and the network service can perform a re-index (i.e., rebuild and/or update the search index). The re-indexing can take into account the size and/or quantity (i.e., number) of partitions/instances based on the total data volume that has been uploaded by the entity and produce a new or updated index based on the size and/or quantity of partitions/instances.

In some embodiments, the network service can direct network traffic away from the storage allocation while the storage allocation (and/or index for the storage allocation) is being modified (e.g., partition resize, addition/subtraction of partition(s), etc.). The network traffic can be directed to a temporary location that stores the data on the storage allocation. When the modification to the storage allocation is complete, the network service can direct network traffic back to the modified storage allocation.

Referring to the previous example, while a new or updated index is being produced and a modified set of elastic network based computing instances/partitions (with a larger partition size and/or more partitions) is being prepared, the network traffic directed at the initial (prior to being modified) instance/partition can be handled by a load balancer. When the new/updated index and the modified set of instances/partitions are available, the network traffic can be directed from the load balancer to the modified set of instances/partitions with the new/updated index.

Various other functions and advantages are described and suggested below as may be provided in accordance with the various embodiments.

FIG. 1 illustrates an example environment 100 in which aspects of the various embodiments can be utilized. The example environment 100 can comprise at least one computing device 102, a network (e.g., Internet) 104, and a network based service 106. The computing device 102 can be communicatively connected to the network service 106 over the network 104. As shown in FIG. 1, there can also be a user of the computing device 102 or other entity (e.g., individual, company, organization, group, etc.) 108. The user or entity 108 can communicate data from the computing device 102 over the network 104 to the network service 106 (and vice versa).

In some embodiments, the network service 106 can be, can be part of, and/or can reside on one or more hosts or servers connected to the network 104. In some embodiments, the network service 106 can be associated with a service provider. For example, the service provider can provide a "pay-as-you-consume" storage service/space via the network service 106 to customers, such as the user of the device 102 or another entity (e.g., company, organization, group, individual, etc.) 108. Accordingly, the user/entity 108 of the computing device 102 can store data from the device 102 onto the network service 106 using the network 104. In other words, the user 108 and/or device 102 can utilize network based computing storage via the network service 106.

In one example, the computing device 102 can transmit data 110 over the network 104 to be stored on the network service 106, as shown in FIG. 1. The data 110 can be any data utilized in network based computing, such as for search, database storage, running an application, running a virtual machine, running an operating system, data related to electronic shopping, etc. The computing device 102 can transmit the data 110 to be stored on a partition 112 provided by the service 106. For example, the user/entity 108 can purchase or rent storage space on the service 106 and the partition 112 can be allocated and assigned to the user/entity 108. In some embodiments, the user/entity 108 can have a particular account and/or storage allocation 114 on the service 106; the storage space (e.g., partition 112) allocated and assigned to the entity 108 can be associated with (e.g., included in) the account/storage allocation 114 for the entity 108.

In some embodiments, for example, the entity 108 can create a network based search domain and the service provider can deploy at least one search partition 112 on the network service 106 to be used for data storage for the network based search domain. The entity 108 can be given an account/storage allocation 114 by the service provider and the partition 112 can be associated with the account/storage allocation 114 of the entity 108. Furthermore, in some embodiments, network based search can support substantially real-time indexing. As the entity 108 sends data (e.g., files, documents, etc.), the size of the index for the network based search domain can grow as well. In other words, the index for the partition 112 for the entity 108 can grow in correlation with the increase in data.

Continuing with the example, as the entity 108 sends more data 110, the space needed to store the data can increase. The network service 106 can detect that the entity 108 has increased its data usage—the amount of data being used and/or the rate at which data is being transmitted to the network service 106 for storing. When the data usage (e.g., amount of data used and/or rate of data transmission) for the entity 108 (or for the device 102 of the entity 108) is beyond a specified threshold (e.g., data amount threshold and/or data rate threshold), the network service 106 can increase the space needed to store the data 110 from the entity 108 (or device 102).

To increase the space needed to store the data 110, the service 106 can, for example, increase the size of the partition 112, as shown in FIG. 1. There can be a maximum size 116 for the partition 112. When the partition 112 has reached its maximum size 116 and more data storage is still needed, then the service 106 can add at least one additional partition 118. In some embodiments, the additional partition 118 can start from a smaller default/initial size and can increase in size as needed. In some embodiments, the additional partition 118 can have a size set at the maximum partition size 116.

Similarly, if the data usage of the entity 108 and/or device 102 decreases beyond a specified threshold (e.g., the amount of data used is below a lower-bound data amount threshold and/or the rate at which data is being removed is beyond a data removal rate threshold), then the service 106 can remove and/or shrink the partitions used.

In some embodiments, there can be an index for the network based search domain. The service 106 can provide for one or more search indexes. For example, there can be a search index for the partition 112 to provide for fast and accurate data retrieval (e.g., search results). The network service 106 can build, re-build, and/or update the search index for the storage associated with the account/storage allocation 114 for the entity 108/device 102. In other words, the network service 106 can modify the search index for the partition 112 to reflect the growth/shrinkage of the partition 112 (including changes in the size and/or quantity of partitions).

In some embodiments, the handling of data usage (including the resizing of partitions, the adding/removing of partitions, and/or the updating of the search index) can be seamless and/or can occur in the background such that the entity 108 and/or device 102 does not experience any lag or interruption in service during the adjusting of the size and/or quantity of partitions associated with the entity 108 and/or device 102. As such, the network service 106 can handle the data usage (including changes to data usage) of the entity 108 and/or the computing device 102 without the need for an instruction or request from the entity 108/device 102.

Figure 2:
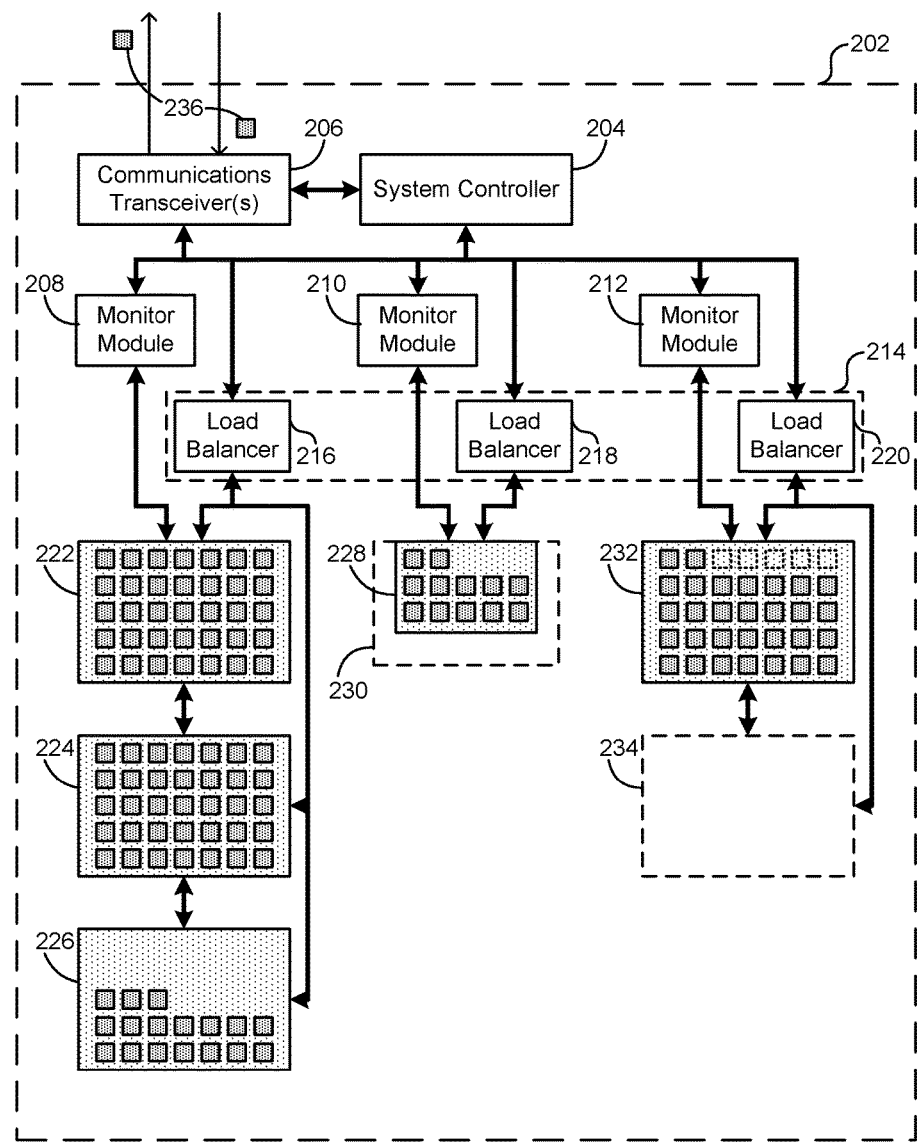
FIG. 2 illustrates an example system embodiment for dynamic search partitioning.

FIG. 2 illustrates an example system embodiment 202 for dynamic search partitioning. The example system embodiment 202 can comprise a system controller 204, one or more communications transceivers 206, one or more monitor modules (e.g., 208, 210, 212), one or more load balancers (e.g., 214, 216, 218, 220), and one or more partitions (e.g., 222, 224, 226, 228, 230, 232, 234) that can be used to store data (e.g., 236).

The example system embodiment 202 can transmit and receive data 236 from one or more computing devices external to the system 202. The data 236 can be any data utilizing in network based computing (i.e., computing in a networked environment). The one or more computing devices can be operated by an entity such as an individual, company, organization, group, etc. Data (e.g., 236) can be transmitted and/or received via the one or more communications transceivers 206 of the system 202. The communications transceiver(s) 206 can be a wired transceiver(s), a wireless transceiver(s), or a combination thereof.

The system controller 204 can facilitate the communications among the various components of the system. For example, the system controller 204 can facilitate the transmission of data from the communication transceiver(s) 206 to the partitions (e.g., 222, 224, 226, 228, 230, 232, 234) to be stored. The system controller can also send and receive signals to and from the one or more monitor modules (e.g., 208, 210, 212) to use as input in various operations. Moreover, the system controller 204 can also send instructions to and receive responses from the one or more load balancers (e.g., 214, 216, 218, 220).

In some embodiments, there can be a storage allocation associated with an entity utilizing the system 202 for network search storage. The entity can be associated with a particular account, which can be linked to the entity's storage allocation. For example, partitions 222, 224, 226 can be part of a storage allocation for a particular entity with a particular account; partition 228 and 230 can be part of another storage allocation for another particular entity with another account; and partitions 232 and 234 can be part of a third storage allocation for a third entity with a third account.

In some embodiments, each of the accounts/storage allocations can work with a respective monitor module (e.g., 208, 210, 212). Among other things, each monitor module can monitor its respective storage allocation. If the monitor module detects that the data usage for its storage allocation has passed beyond a specified threshold, the monitor module can send a signal to the system controller 204. For example, if the monitor module for a storage allocation detects that the amount of data stored on a partition included in the storage allocation is below a minimum threshold, then the monitor module can inform the system controller 204 and the system controller 204 can reduce the size of the partition. In another example, if the monitor module for a storage allocation detects that the rate of data being transmitted to a partition included in the storage allocation is greater than a maximum threshold, then the monitor module can inform the system controller 204 and the system controller can increase the size of the partition and/or add an additional partition to the storage allocation.

In one example, monitor module 210 can detect that data usage, in the form of the amount of data being used, for the storage allocation including partition 228 has passed a specified threshold (e.g., an upper-bound data amount threshold). The monitor module 210 can transmit a signal to the system controller 204 indicating that the data usage (e.g., amount of data) has passed the threshold for partition 228. In response, the system controller 204 can increase the size of partition 228, resulting in a larger partition 230.

In another example, monitor module 212 can detect that data usage, in the form of rate of data growth, for the storage allocation including partition 232 has passed a specified threshold (e.g., an upper-bound data rate threshold). The monitor module 212 can signal the system controller 204 and the system controller 204 can in turn add an additional partition 234 to the storage allocation.

In some embodiments, the system controller 204 can determine, based on the rate of traffic that affects CPU usage of the storage allocation, the amount of data on the storage allocation, and/or the rate of data upload/removal for the storage allocation, how to modify the type/size/quantity of partitions/instances for the storage allocation. In some embodiments, the system controller 204 can take into consideration both the CPU usage (e.g., traffic consumption) and the data usage (e.g., RAM and/or disk usage), and then collectively with information about both CPU and data usage, make a determination as to how to modify the storage allocation.

In some embodiments, the system controller 204 can calculate a threshold for a specified (partition included in a) storage allocation. For example, when a storage allocation is modified (e.g., to include a larger partition and/or more partitions), the system controller 204 can inform the monitor module for that storage allocation what threshold to consider for (the partition(s) in) the storage allocation.

FIG. 2 also shows one or more load balancers (e.g., 214, 216, 218, 220). In some embodiments, the one or more load balancers can be one or more flexible, adjustable, customizable, and/or automatic load balancers. In some embodiments, there can be a load balancer 214 to be shared amongst a plurality of storage allocations (and partitions). In some embodiments, each storage allocation can operate with a load balancer (e.g., 216, 218, 220). A load balancer can, for example, distribute data amongst the partitions, maximize throughput, minimize response time, achieve optimal resource utilization, and avoid overload. In some embodiments, a load balancer can facilitate in the temporary storage of data while a storage allocation is being resized (e.g., a partition in the storage allocation is resized, a partition is being added to the storage allocation, a partition is being removed from the storage allocation, etc.).

Figure 3:
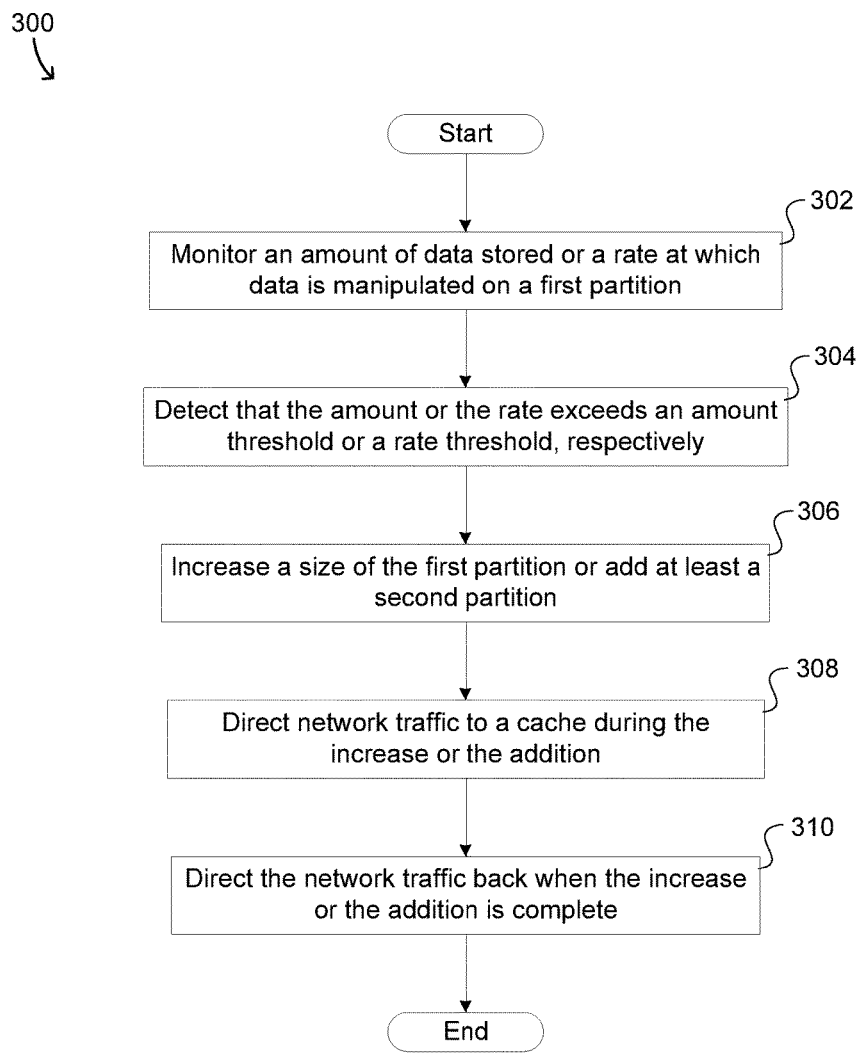
FIG. 3 illustrates an example method embodiment for dynamic search partitioning.

FIG. 3 illustrates an example method embodiment 300 for dynamic search partitioning. It should be understood that there can be additional, fewer, or alternative steps performed in similar or alternative orders, or in parallel, within the scope of the various embodiments unless otherwise stated. In some embodiments, the example method embodiment 300 can start with monitoring at least one of an amount of data being stored or a rate at which data is being manipulated on a first partition provided by a network service, at step 302. The first partition can be included in a storage allocation provided by the network service. The example method 300 can, at step 304, detect that the amount or the rate exceeds a specified amount threshold or a specified rate threshold, respectively.

At step 306, the method 300 can perform, in response to the detecting, an increase to a size of the first partition and/or an addition of at least a second partition to the storage allocation. The increase and/or the addition can be based at least in part on the amount of data being stored or the rate at which data is being manipulated. Step 308 can involve directing network traffic associated with the storage allocation to a cache provided by the network service during the increase or the addition. The method 300 can direct the network traffic to the storage allocation when the performing of the increase or the addition is complete, at step 310.

Figure 4:
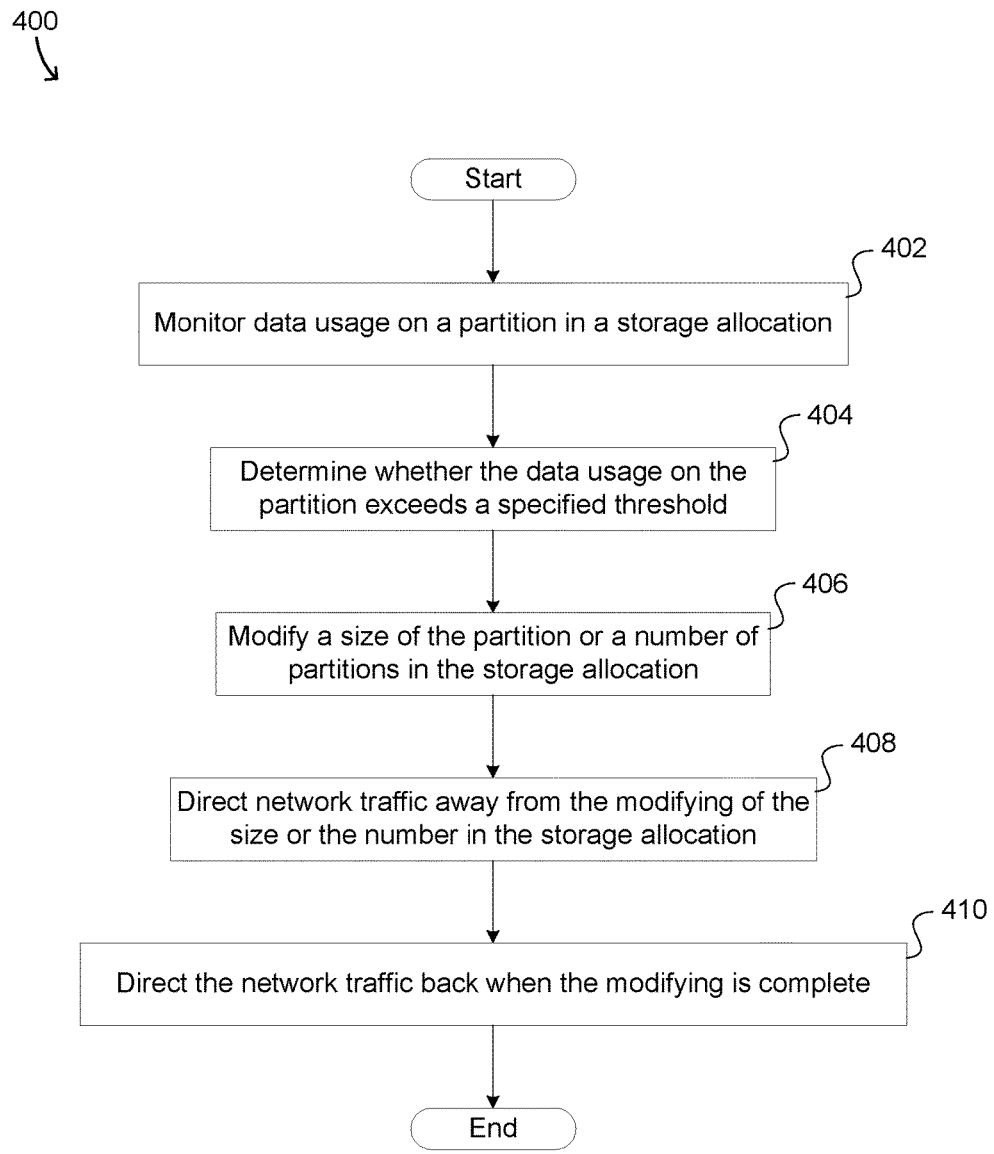
FIG. 4 illustrates an example method embodiment for dynamic search partitioning.

FIG. 4 illustrates an example method embodiment 400 for dynamic search partitioning. Again, it should be understood that there can be additional, fewer, or alternative steps performed in similar or alternative orders, or in parallel, within the scope of the various embodiments unless otherwise stated. At step 402, the example method embodiment 400 can monitor data usage on a storage allocation in a networked environment. The storage allocation can have a number of partitions including at least one partition. At step 404, the example method 400 can determine whether the data usage on the partition included in the storage allocation exceeds a specified threshold. Step 406 can involve modifying at least one of a size of the partition or the number of partitions included in the storage allocation. The example method 400 can, at step 408, direct network traffic associated with the storage allocation away from a portion of the storage allocation associated with the modifying of the at least one of the size or the number. The network traffic can be handled/processed by another portion of the storage allocation during the modifying. Then the method 400 can direct the network traffic to the portion of the storage allocation associated with the modifying when the modifying is complete, at step 410.

There can be various factors that contribute to determining whether, when, and/or how to increase or decrease the size and/or quantity of partitions. In some embodiments, logic for determining when to increase or decrease partition size and/or quantity can be based on the size(s) of instances available. For example, a storage allocation can utilize one partition/instance and grow that partition/instance until it reaches a maximum size; then there can be an additional partition/instance can be added to the storage allocation. In some embodiments, the additional partition/instance can be at the maximum size.

In some embodiments, factors that can contribute to determining whether, when, and/or how to increase or decrease the size and/or quantity of partitions include the specifications of the partition(s)/instance(s) and/or storage allocation that are available. For example, the capacity of RAM, CPU utilization, bandwidth availability, ratio of memory to CPU, etc., can all be factors taken into consideration by the network service.

In some embodiments, search query traffic can also be a factor. For example, if an entity (e.g., customer) does not require large storage space (and thus is using small partitions/instances in its storage allocation) but has a lot of network traffic, then the network service can modify the entity's storage allocation (e.g., increase size/quantity of partition(s), change the type of partition/instance into one with more CPU power, etc.). In another example, if an entity has a large instance(s) on its storage allocation but the queries are complex (thus resulting in high latency), then the network service can decide to modify the storage allocation to include smaller (and perhaps more) partitions, which can attempt to reduce latency.

In some embodiments, the network service can modify the storage allocation based on the amount of network traffic by performing at least one of modifying the size of at least one partition included in the quantity of partitions, modifying the quantity of partitions, or replacing at least one partition included in the quantity of partitions with at least one partition having different specifications. In some embodiments, the different specifications for the partition can include at least one of a different CPU power, a different capacity of RAM, a different capacity of hard disk space, or a different capacity of bandwidth.

In some embodiments, the network service can attempt to determine an optimal storage allocation modification procedure such that the modifying of the storage allocation occurs as fast as possible within a reasonable cost boundary. In some embodiments, data on the storage allocation can be stored in a search tree structure. To figure out the size of the search index, a predictive model and/or machine learning, for example, can be utilized.

In some embodiments, when the modified storage allocation (e.g., modified to include a larger partitions and/or more partitions) is made available and the network traffic for the storage allocation has been directed from the temporary location (e.g., via load balancer) back to the storage allocation, then the previous (unmodified) storage allocation can be deprecated. For example, memory in the networked environment allocated to the previous (unmodified) storage allocation can be freed up.

In some embodiments, there can be a fixed threshold(s) for (the partition(s) included with) the storage allocation(s). In some embodiments, there can be adaptive and/or variable thresholds, which can be determined based on previous patterns (e.g., historic data) of data usage. For example, if a particular entity has a pattern of increasing data usage for a certain amount at a certain time of the year, then the threshold(s) for the entity's storage allocation(s) can be adjusted accordingly based on the pattern. This can improve the efficiency of the network search storage and perhaps further ensure that the entity does not experience lag (e.g., while uploading data, while searching for stored data, etc.) during the modification of the storage allocation.

In some embodiments, a configuration of the storage allocation can be modified based on at least one of a configuration associated with the data usage or a user-initiated input. Moreover, in some embodiments, the storage allocation can determine when to perform the modifying of the at least one of the size or the number based on resources available to the storage allocation.

Various embodiments consistent with the present disclosure can also be implemented with multiple entities, computing devices, accounts, and/or storage allocations. For example, one entity can have multiple computing devices and/or multiple accounts (and storage allocations associated with those accounts). In another example, one account and storage allocation can be used by multiple entities and/or computing devices.

Figure 5:
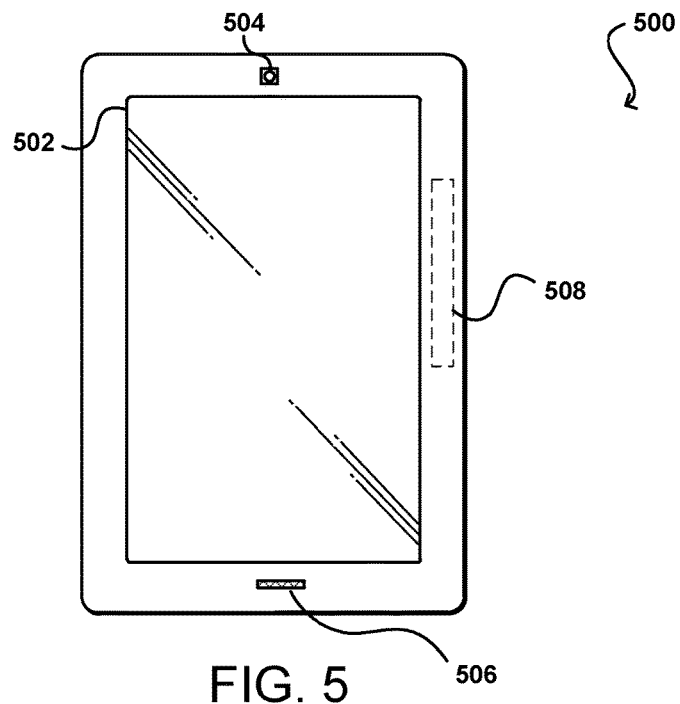
FIG. 5 illustrates an example device that can be used to implement aspects of the various embodiments.

FIG. 5 illustrates an example electronic user device 500 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device 500 can be an analog device, such as a device that can perform signal processing using operational amplifiers. In this example, the computing device 500 has a display screen 502 on the front side, which under normal operation will display information to a user facing the display screen (e.g., on the same side of the computing device as the display screen). The computing device in this example includes at least one camera 504 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 500 also includes at least one microphone 506 or other audio capture device capable of capturing audio data, such as words or commands spoken by a user of the device. In this example, a microphone 506 is placed on the same side of the device as the display screen 502, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 500 also includes at least one orientation sensor 508, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 6:
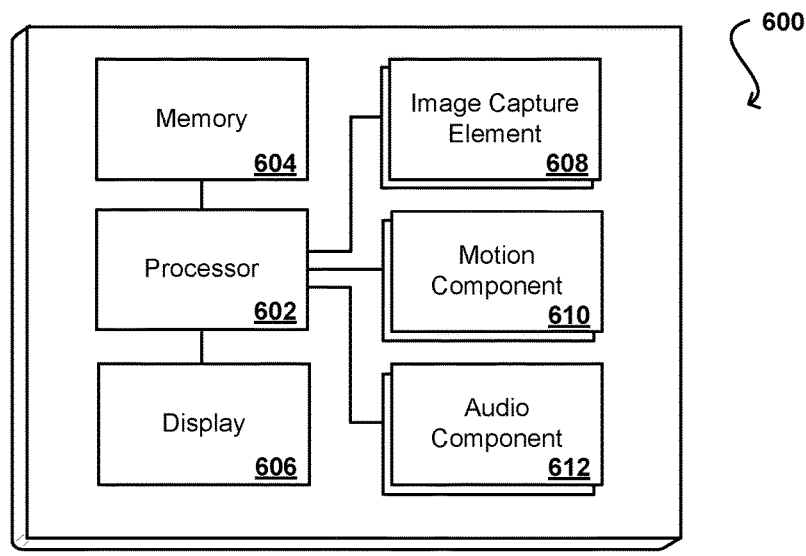
FIG. 6 illustrates example components of a client device such as that illustrated in FIG. 5.

FIG. 6 illustrates a logical arrangement of a set of general components of an example computing device 600 such as the device 500 described with respect to FIG. 5. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one image capture element 608 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 612, such as a mono or stereo microphone or microphone array, operable to capture audio information from at least one primary direction. A microphone can be a uni- or omni-directional microphone as known for such devices.

In some embodiments, the computing device 600 of FIG. 6 can include one or more communication elements (not shown), such as a Wi-Fi, BLUETOOTH, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 600 also can include at least one orientation or motion sensor 610. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 602, whereby the device can perform any of a number of actions described or suggested herein.

As an example, a computing device such as that described with respect to FIG. 5 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 7:
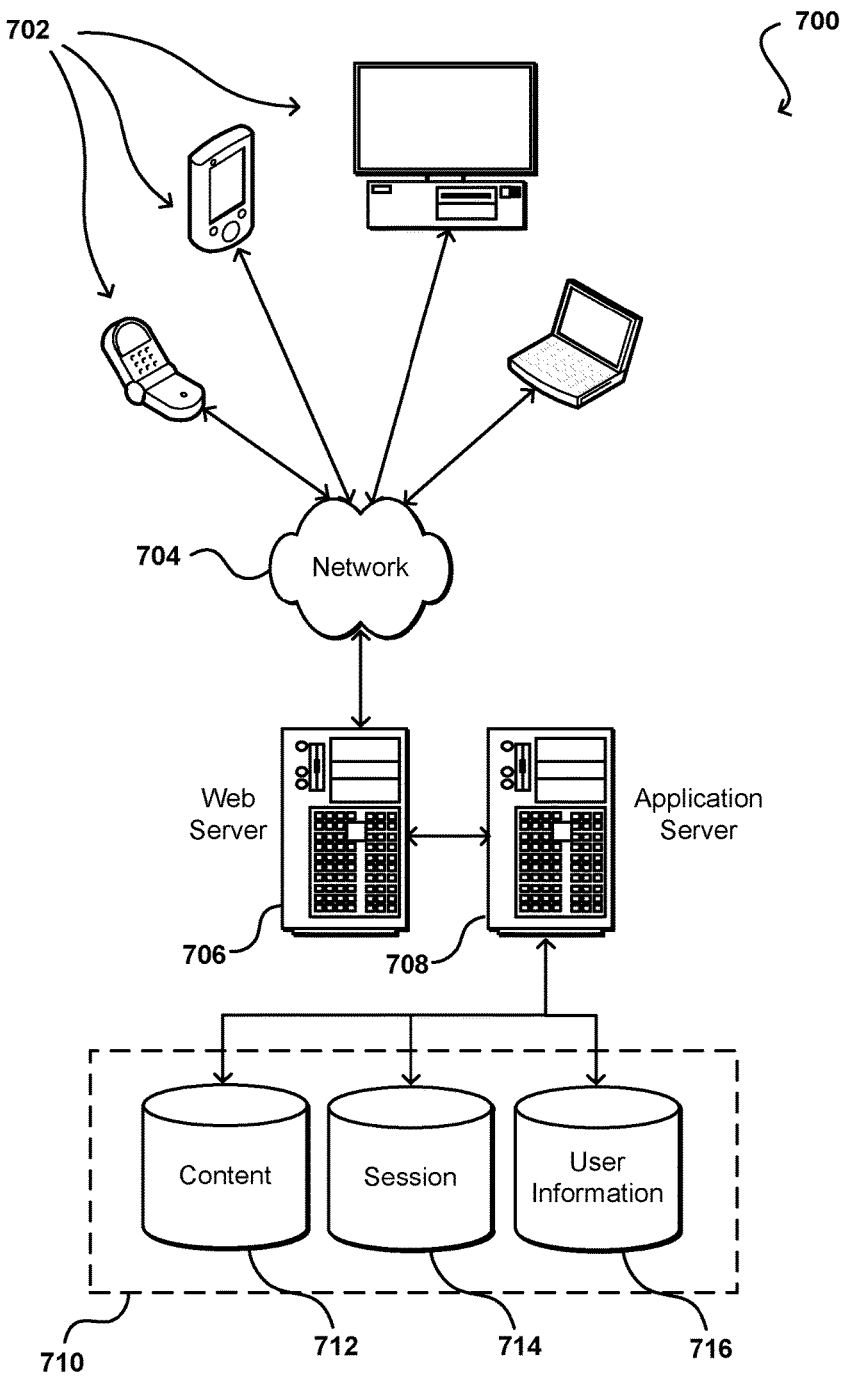
FIG. 7 illustrates an environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 702. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    monitoring usage of data for a storage allocation in a networked environment;
    determining that network traffic, associated with the storage allocation and corresponding to a search query type, satisfies a modification criterion corresponding to a search query type complexity associated with latency and at least one of a volume of the network traffic or a rate of manipulation of data in the network traffic;
    modifying a size of at least one partition of the storage allocation based on the network traffic satisfying the modification criterion;
    detecting that a size of a search index, for the at least one partition of the storage allocation, exceeds a specified index size threshold; and
    updating the search index.

2. The computer-implemented method of claim 1, further comprising:
    rebuilding the search index for the at least one partition of the storage allocation to reflect the modifying the size of the at least one partition.

3. The computer-implemented method of claim 1, further comprising:
    determining whether the data usage on at least one partition of a set of partitions included in the storage allocation exceeds a specified threshold,
    wherein the data usage includes at least one of an amount of data being stored on the storage allocation or a rate at which data is being manipulated on the storage allocation.

4. The computer-implemented method of claim 3, wherein the specified threshold includes at least one of a specified amount threshold or a specified rate threshold, and wherein the data usage exceeds the specified threshold when there is an occurrence of at least one of the amount of data being stored exceeding the specified amount threshold or the rate at which data is being manipulated exceeding the specified rate threshold.

5. The computer-implemented method of claim 1, further comprising:
    determining that an amount of network traffic directed to the storage allocation is above a specified traffic threshold; and
    modifying the storage allocation based on the amount of network traffic.

6. The computer-implemented method of claim 5,
    wherein the network traffic includes search query traffic for searching data stored on the storage allocation.

7. The computer-implemented method of claim 1, wherein the modifying the size of the at least one partition further comprises:
    increasing the size of the at least one partition based on the size of the at least one partition being below a maximum partition size threshold.

8. The computer-implemented method of claim 1, wherein the modifying the size of the at least one partition includes decreasing the size of the at least one partition, and further comprising:
    decreasing a number of partitions in a set of partitions associated with the storage allocation based on the number of the partitions in the set of partitions being greater than two partitions.

9. The computer-implemented method of claim 1, further comprising:
  determining a CPU usage of the storage allocation, wherein the modifying the size is based on at least one of the data usage on the storage allocation or the determined CPU usage of the storage allocation.

10. The computer-implemented method of claim 1, further comprising:
  modifying a configuration of the storage allocation based on at least one of data associated with the data usage or an indication of input by a user.

11. The computer-implemented method of claim 1, further comprising:
  determining a time to perform the modifying of the size based at least on resources available to the storage allocation.

12. The computer-implemented method of claim 1, further comprising:
  directing the network traffic away from a portion of the storage allocation associated with the modifying.

13. The computer-implemented method of claim 12, further comprising:
  determining that the modifying is complete; and
  directing the network traffic to the portion of the storage allocation associated with the modifying when the modifying is complete.

14. The computer-implemented method of claim 1, wherein the storage allocation includes a number of sets of partitions, each set of partitions associated with a different account.

15. The computer-implemented method of claim 1, further comprising:
  determining that the size of the first partition is at the maximum partition size threshold; and
  adding at least an additional partition.

16. A system comprising:
  a storage allocation in a networked environment having a plurality of partitions;
  at least one processor; and
  a memory device including instructions that, when executed by the at least one processor, cause the system to:
  monitor usage of data for the storage allocation;
  determine that network traffic, associated with the storage allocation and corresponding to a search query type, satisfies a modification criterion corresponding to a search query type complexity associated with latency and at least one of a volume of the network traffic or a rate of manipulation of data in the network traffic;
  modify a size of at least one partition of the plurality of partitions based on the network traffic satisfying the modification criterion;
  detect that a size of a search index, for the at least one partition of the plurality of partitions, exceeds a specified index size threshold; and
  update the search index.

17. The system of claim 16, wherein the instructions, when executed by the at least one processor, further cause the system to:
  determine whether the data usage on at least one partition of a set of partitions associated with the storage allocation exceeds a specified threshold,
  wherein the data usage includes at least one of an amount of data being stored on the storage allocation or a rate at which data is being manipulated on the storage allocation.

18. A non-transitory computer-readable storage medium including instructions, which when executed by a processor of a computing system cause the computing system to:
  monitor usage of data for a storage allocation in a networked environment;
  determine that network traffic, associated with the storage allocation and corresponding to a search query type, satisfies a modification criterion corresponding to a search query type complexity associated with latency and at least one of a volume of the network traffic or a rate of manipulation of data in the network traffic;
  modify a size of at least one partition of the plurality of partitions based on the network traffic satisfying the modification criterion;
  detect that a size of a search index, for the at least one partition of the plurality of partitions, exceeds a specified index size threshold; and
  update the search index.

* * * * *

UNITED STATES PATENT AND TRADEMARK OFFICE
CERTIFICATE OF CORRECTION

PATENT NO. : 10,289,603 B2  Page 1 of 1
APPLICATION NO. : 15/362503
DATED : May 14, 2019
INVENTOR(S) : Jonathan Michael Goldberg, Asif Mansoor Ali Makhani and Ekechi Karl Edozle Nwokah It is certified that error appears in the above-identified patent and that said Letters Patent is hereby corrected as shown below:

On the Title Page

(73) Assignee: Amazon TEchnologies, Inc., Reno, NV (US) should be A9.com, Inc., Palo Alto, CA (US)

Signed and Sealed this
Thirtieth Day of June, 2020

Andrei Iancu
*Director of the United States Patent and Trademark Office*